(12) United States Patent
Garera et al.

(10) Patent No.: US 9,208,442 B2
(45) Date of Patent: Dec. 8, 2015

(54) ONTOLOGY-BASED ATTRIBUTE EXTRACTION FROM PRODUCT DESCRIPTIONS

(71) Applicant: Wal-Mart Stores, Inc., Bentonville, AR (US)

(72) Inventors: Nikesh Lucky Garera, Mountain View, CA (US); Narasimhan Rampalli, Los Altos, CA (US); Dintyala Venkata Subrahmanya Ravikant, San Bruno, CA (US); Srikanth Subramaniam, San Jose, CA (US); Chong Sun, Redwood City, CA (US); Heather Dawn Yalin, Alameda, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 298 days.

(21) Appl. No.: 13/871,636

(22) Filed: Apr. 26, 2013

(65) Prior Publication Data
US 2014/0324740 A1    Oct. 30, 2014

(51) Int. Cl.
*G06N 5/02*    (2006.01)
(52) U.S. Cl.
CPC ..................... *G06N 5/022* (2013.01)

(58) Field of Classification Search
CPC ..................................... G06N 5/022
See application file for complete search history.

(56) References Cited

U.S. PATENT DOCUMENTS

| | | |
|---|---|---|
| 5,541,836 A | 7/1996 | Church |
| 8,140,589 B2 | 3/2012 | Petri |
| 8,417,651 B2 * | 4/2013 | Kannan et al. ............ 706/12 |
| 2008/0228797 A1 | 9/2008 | Kenedy |
| 2009/0144609 A1 | 6/2009 | Liang |
| 2012/0102055 A1 | 4/2012 | Hu |

\* cited by examiner

*Primary Examiner* — Alan Chen
(74) *Attorney, Agent, or Firm* — Bryan Cave LLP

(57) ABSTRACT

Systems and methods are disclosed herein for obtaining a structured listing of attributes and corresponding values based on an unstructured document, such as a product description in a product record. Putative values are identified in the document and corresponding candidate attributes are identified in a taxonomy. Attribute-value pairs are then evaluated with respect to a plurality of rules. Attribute-value pairs and outputs of the one or more rules are evaluated using a machine-learning algorithm, such as a decision tree, in order to determine which attribute-value pairs to retain. Retained attribute-value pairs are stored and used to respond to search queries and facilitate comparison of products. Attributes selected may also be used to update a product template.

20 Claims, 4 Drawing Sheets

ONTOLOGY-BASED ATTRIBUTE EXTRACTION FROM PRODUCT DESCRIPTIONS

BACKGROUND

1. Field of the Invention

This invention relates to systems and methods for identifying attributes of an entity, such as a product, from unstructured data.

2. Background of the Invention

Many attempts have been made to automatically classify documents or otherwise identify the subject matter of a document. In particular, search engines seek to identify documents that are relevant to the terms of a search query based on determinations of the subject matter of the identified documents. Another area in which classification of documents is important is in the area of product-related documents such as product descriptions, product reviews, or other product-related content. The number of products available for sale constantly increases and the number of documents relating to a particular product is further augmented by social media posts relating to products and other content.

Often, a document describing a product includes unstructured data, e.g. free-form text by a manufacturer, retailer, expert, enthusiast, or the like. However, such text is not readily used to compare products. For example, a customer wishing to comparison shop is burdened with extracting relevant information from this unstructured data in order to make an informed decision.

In view of the foregoing, it would be an advancement in the art to provide methods for generating a structured representation of unstructured data, particularly product-related documents.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
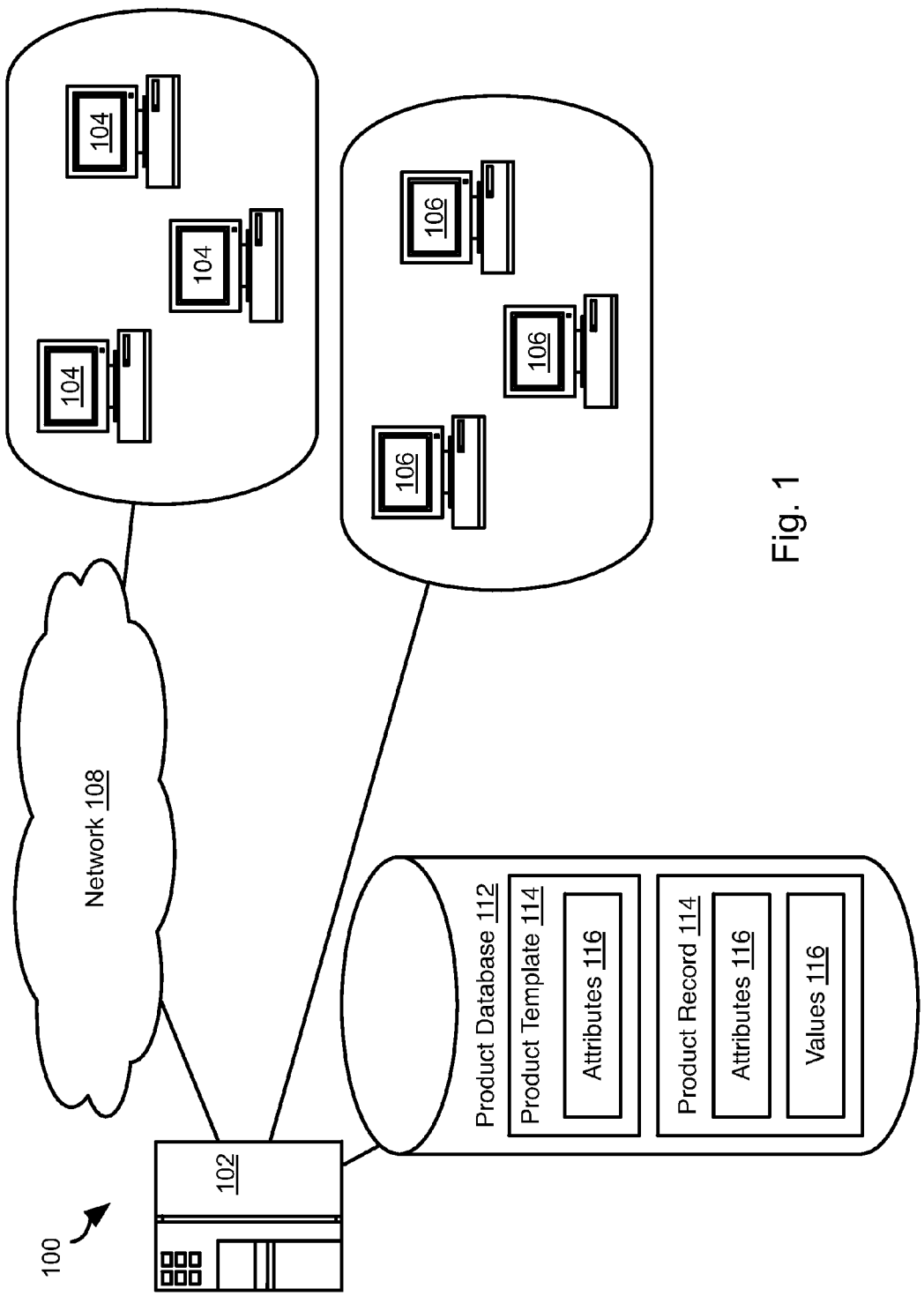
FIG. 1 is a schematic block diagram of a system for performing methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

FIG. 1 illustrates a system 100 in which methods described hereinbelow may be implemented. The system 100 may include one or more server systems 102 that may each be embodied as one or more server computers each including one or more processors that are in data communication with one another. The server system 102 may be in data communication with one or more analyst workstations 104 and one or more user workstations 106. In the methods disclosed herein, the analyst workstations 104 and user workstations 106 may be embodied as mobile devices such as a mobile phone or tablet computer.

In some embodiments, some or all of the methods disclosed herein may be performed using a desktop computer or any other computing device as the analyst computers 104 or user workstations 106. For purposes of this disclosure, discussion of communication with a user or entity or activity performed by the user or entity may be interpreted as communication with a computer 104, 106 associated with the user or entity or activity taking place on a computer associated with the user or entity.

Some or all of the server 102, analyst computers 104, and user workstations 106 may communicate with one another by means of a network 108. The network 108 may be embodied as a peer-to-peer connection between devices, a connection through a local area network (LAN), WiFi network, the Internet, or any other communication medium or system.

The server system 102 may be associated with a merchant, or other entity, providing classification services of documents. For example, the server system 102 may host a search engine or a site hosted by a merchant to provide access to information about products and user opinions about products. The server system 102 may additionally or alternatively implement a social networking site that enables the generation of content by a user. For example, the server system 102 may store, provide access to, or enable generation of, social media content for a site such as Facebook™, Twitter™, FourSquare™, LinedIn™, or other social networking or blogging site that enables the posting of content by users.

In some embodiments, the server system 102 may host or access a product database 112. The product database 112 may include one or more product templates 114 including one or more attributes 116. A product template 114 may be associated with a category of products that have common attributes and the attributes 116 may list attributes common to some or all products belonging to that category. The product database 112 may additionally or alternatively include product records 114 for specific products and list attributes 116 corresponding to that product (such as those defined by a product template 114) and values 116 for those attributes.

Figure 2:
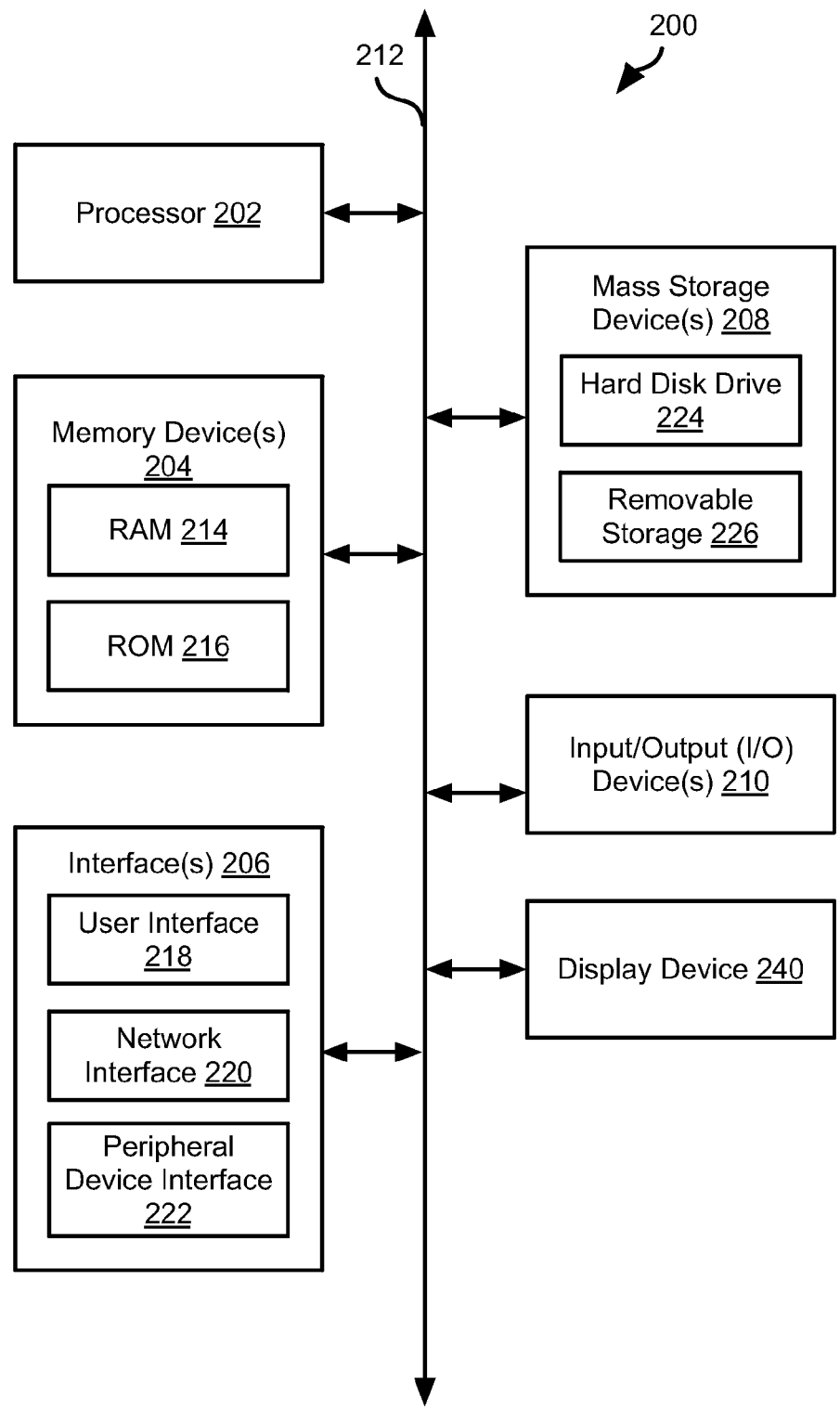
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102, analyst workstation 104, and user workstation 106 may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
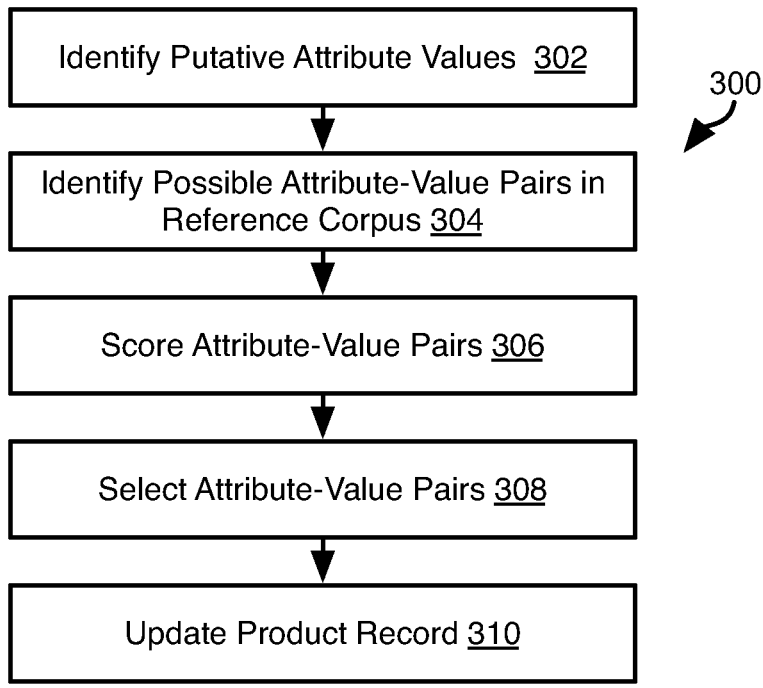
FIG. 3 is a process flow diagram of a method for identifying attributes in a document in accordance with an embodiment of the present invention.

FIG. 3 illustrates a method 300 for identifying attributes in product records. Although the methods disclosed herein are described with respect to product records, other documents may also be processed according to the methods disclosed herein. The method 300 may be executed by a server system 102 or accessed by the server system 102.

The method 300 may include identifying 302 values in a product record being evaluated that may correspond to a product attribute. Values may be identified according to a part of speech, e.g. adjectives, adverbs, nouns, etc. Values may be identified according to "is a" relationships, e.g. text indicating "[product] is a [value]." Methods described hereinbelow may be used to identify those attribute-value pairs that are appropriate for the product record. Accordingly, the step of identifying 302 putative values may be somewhat unrestricted in identifying potential values. For example, in some embodiments, all strings may be deemed putative values other than those strings that obviously not values, e.g. common words such as "and," "is," "the," and the like that are identified automatically or by an analyst as being unlikely to communicate a meaningful value for all product records or product records belonging to a particular category of products.

The method 300 may further include identifying 304 candidate attributes that correspond to identified 302 values. Each value may potentially have multiple candidate attributes associated therewith. In some embodiments a plurality of candidate attribute-value pairs may be identified. For example, attributes may be identified in a taxonomy, such as any schema, dictionary, or other reference corpus, according to a dictionary-based search. For example, the taxonomy may be searched for each value, e.g. a word or phrase, to identify a corresponding entry in the reference corpus that includes that word or phrase. For example, the reference corpus may include entries for some or all of products, product records, attributes, and attribute-value pairs. Accordingly, entries with attribute-value pairs including an identified 302 value may be identified 304 as a candidate attribute-value. The identified 304 attribute-value pairs may then be scored 306. An example method for scoring the attribute-value pairs is described below with respect to FIG. 5.

The scores assigned to the attribute-value pairs at step 306 may then be used to select 308 one or more selected attribute-value pairs. For example, the top N attribute-value pairs with the highest scores may be selected. In some embodiments, those attribute-value pairs with scores above a threshold may be selected. Other selection criteria based on the scores may also be used. As will be described below, in some embodiments, a machine learning algorithm may be used to select attribute-value pairs. For example, an attribute-value pair for the document may have a plurality of scores associated therewith as described below. A decision tree algorithm may process the scores in order to one or both of make a decision whether to retain or discard an attribute value pair and to generate a final score that combines the scores, with the final score being used to select attribute-value pairs, such as by comparison to a threshold.

A product record may then be updated 310 according to the selected 308 attribute-value pairs. For example, an unstructured product record may be replaced or augmented with structured attribute-value data for use in responding to queries and to assist in comparison of related products. In some embodiments, a template for a product type or category to which the product record belongs may be updated to include some or all of the selected 308 attributes from the attribute-value pairs. For example, where a significant portion, e.g. 90% or some other percentage, of product records belonging to a category have attribute-value pairs referencing the same attribute, this attribute may be added to a template for that category.

Figure 4:
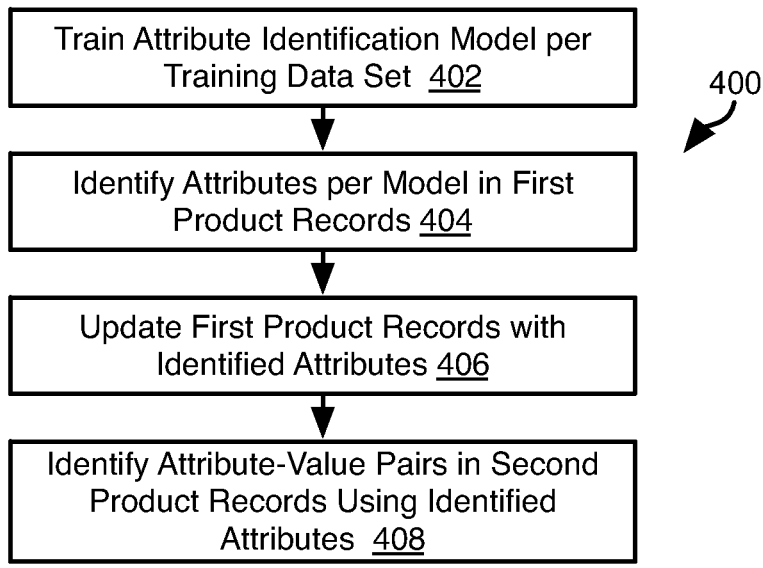
FIG. 4 is a process flow diagram of a method for processing a document corpus to generated structured records in accordance with an embodiment of the present invention.

FIG. 4 illustrates a method 400 in which attribute-value pairs identified according to the method 300 for a product record may be used. The method 400 may be executed by a server system 102 or accessed by the server system 102.

The method 400 may include training 402 an attribute identification model using a training data set. The entries of the training data set may each include as an input an unstructured description of a product. The entries of the training data set may each include as an output attribute-value pairs corresponding to the unstructured description of the input. The attribute-value pairs of the output may be associated with the unstructured data of the input according to human judgment, such as by analysts or using structured data provided by a manufacturer or retailer for the product described in the unstructured data. Using the training data, scores may be calculated for each entry, such as according to the method 500 of FIG. 5, described below. These scores may then be used to train a machine learning model, such as a decision tree model, to relate the scores for the inputs to the attribute-value pairs specified in the outputs for the training data.

Using the attribute identification model as trained 402, attributes, such as attribute-value pairs, may be identified 404 in first product records. The first product records may include unstructured data exclusively or may include both structured and unstructured data. Identifying 404 attributes in the first product records may include performing the method 300 with respect to the first product records.

Using the attributes, such as attribute-value pairs, identified at step 404, the first product records may be updated 406. As noted above, this may include adding the attribute-value pairs to the product record or creating a new product record including the attribute-value pairs. As also noted above, a product template for a product category to which the product record belongs may also be updated to include one or more of the identified 404 attributes.

The attribute-value pairs associated with the first product records and any updates to a product template may be used for any purpose for which structured data may be useful. In particular, comparable products may be presented for viewing to a user with attributes presented in a way to enable ready comparison, such as side-by-side display of attributes. As shown in FIG. 4, the attributes identified according to methods disclosed herein may also be used to identify 408 attribute-value pairs in second product records. For example, attribute-value combinations with which a first product record is labeled may be used to identify references to a product in second product records based on attribute mentions in documents that do not explicitly identify the product associated with a product record, such as described in U.S. application Ser. No. 13/688,060 filed Nov. 28, 2012 and entitled IDENTIFYING PRODUCT REFERENCES IN USER-GENERATED CONTENT, which is hereby incorporated herein by reference in its entirety.

Figure 5:
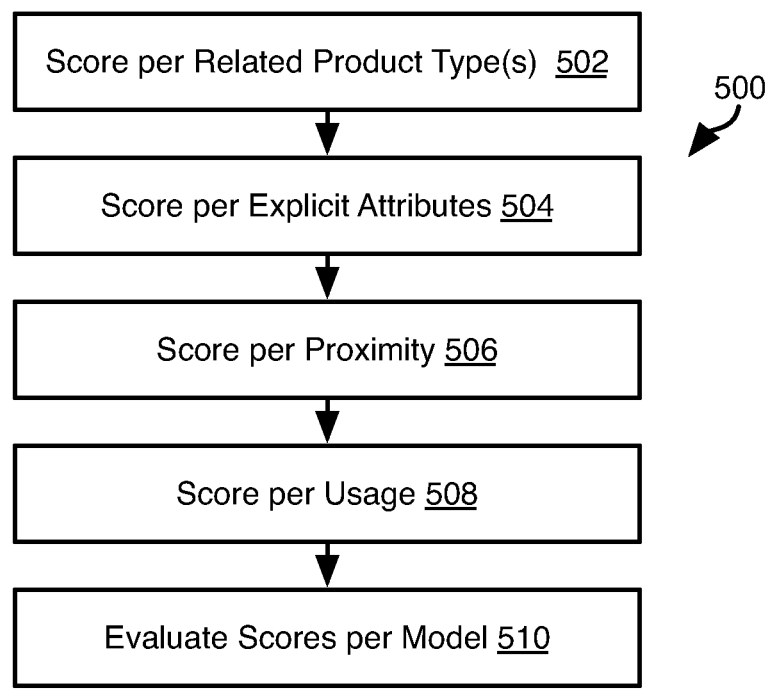
FIG. 5 is a process flow diagram of a method for evaluating candidate attributes in accordance with an embodiment of the present invention.

FIG. 5 illustrates a method 500 for assigning scores to candidate attribute-value pairs of a product record for use in selecting attribute-value pairs. The scores according to the steps described herein may assign numeric score that may have various values in range. Some or all of the scores assigned as described below may also be binary values, e.g. 1 or 0, true or false, or some other pair of values.

The method 500 may include scoring 502 the product record according to one or more related product types. A related product type may be identified using any classification algorithm known in the art, such as a search engine that identifies documents relevant to a prompt embodied as the product record, where the documents are nodes in a taxonomy. In some embodiments, related products types may be identified according to methods described in U.S. application Ser. No. 13/756,443, filed Jan. 31, 2013, which is hereby incorporated herein by reference. Identifying related product types may also include classifying a product record using the methods disclosed in U.S. application Ser. No. 13/756,467, filed Jan. 31, 2013, which is hereby incorporated hereinby reference.

In some embodiments, scoring 502 the product record according to identified product type may include selecting the top N, e.g. 5, product types identifies as being most relevant to the product record. A score based on product type may be of the form Product_Type_A=1, indicating that product type "A" is one of the identified product types. In other embodiments, attributes associated with the identified product types may be compared to the candidate attribute-value pairs for the product record. For example, the product types may include structured records that identify a set of attributes common to products belonging to the product types. Accordingly, a candidate attribute-value pair of the product record may be scored 502 based on the identified product types according to whether or not the attribute of the attribute-value pair matches an attribute in the top N related product types. Accordingly, a score assigned to an attribute-value pair based on product type may be of the form Product_Type_Match=1, if the attribute of the attribute-value pair matches one of the identified product types. In some embodiments, the score assigned may be of the form Product_Type_Count=M, where M is the number of the identified product types that include the attribute of the attribute-value pair. In still other embodiments, the score assigned may be of the form, Product_Type_A_Match=1, where A is one of the identified product types and the value is set to 1 if the attribute of an attribute value pair matches an attribute of product type A. Scores of this same form may be assigned (1 or 0) for each identified product type for each attribute-value pair in some embodiments.

The method 500 may include assigning 504 a score to candidate attribute-value pairs of the product record according to explicit attributes. In some embodiments, a product record may be ingested from an outside entity and may include both structured and unstructured data. Accordingly, assigning 504 a score to an attribute-value pair based on explicit attributes may include assigning a positive (e.g. 1, true, yes) binary value to the attribute-value pair is one or both of the attribute and value are explicitly specified as an attribute and value, respectively, e.g. Explicit_Attribute=1.

The method 500 may include assigning 506 scores to attribute-value pairs of the product record based on proximity. For example, if the product record includes a textual representation of the attribute of the attribute value pair, a score may be assigned according to a separation between the value and the attribute. For example, a score may be assigned as Attribute_Proximity=3, where three words separate the attribute and value. Where a textual representation of the attribute isn't present, the value may be assigned as Attribute_Proximity=NaN (not a number), or some other value indicating that the attribute is not present within the product record itself.

Assigning 506 a score to an attribute-value pair may further include assigning one or more scores according to proximity to words other than the attribute. For example, one or more scores may be assigned to an attribute-value pair according to one or more words preceding or following the value in the product record. For example, a whitelist of words indicative of importance of a value may be maintained. Accordingly, a score assigned according to preceding or following words may be of the form WhitelistWord_Following=1(true), WhitelistWord_Following=3 (e.g. 3 words separation), where "WhitelistWord" is a word in the whitelist. A score may also be assigned according to blacklist words in the same manner, where a blacklist word is a word that indicates that a proximate word is likely not important.

The method 500 may include assigning 508 the candidate attribute-value pairs scores according to usage in the product record or elsewhere. For example, in some embodiments, a score may be assigned to an attribute-value pair according to global usage, such as an inverse document frequency score (IDF) for a corpus of product records or some other corpus.

In some embodiments, a score may be assigned to an attribute-value pair according to a part of speech the value fulfills in the product record, e.g. noun, adjective, adverb, verb, etc. For example, a score according to part of speech may be assigned as Is_Noun=1 (e.g. true).

In some embodiments, a score may be assigned to an attribute-value pair according to a number of occurrences of the value, or forms of the same root word as value, in the product record. For example, a score may be assigned to an attribute-value pair as Usage_Count=N.

In some embodiments, a score may be assigned to an attribute-value pair according to where one or more instances of the value occur. For example, a value may be assigned a score Title=True, First_Paragraph=True, or the like. In some embodiments, an attribute-value pair may be assigned a score according to whether one or more instances of the value occur in a hyperlink, e.g. In_Hyperlink=True, or In_Hyperlink=N, where N is a number of instances in hyperlinks to unique URLs (uniform resource locators). In some embodiments, an attribute-value pair may be assigned a score according to where an instance of the value occurs in a sentence and/or the role the word plays in the sentence, e.g. First_Word=1, Last_Word=true, Is_Subject=1, Is_Object=true, Is_Direct_Object=false, or the like.

In some embodiments, a score may be assigned to a value based on usage of the value in a taxonomy. For example, if a value is included in a superstring in a title of a node in the taxonomy, a score may be assigned accordingly. For example, if a value is the numeral "7" and a node in the taxonomy is "Windows 7," the attribute-value pair including 7 may be assigned a score In_Superstring=1.

In some embodiments, an attribute-value pair may be assigned a score according to whether the attribute corresponds to a sense in which the value of the pair is used in the product record. Various methods exist for performing word sense disambiguation (WSD). Any of such methods may be used to determine a sense of the value. Accordingly, a score may be assigned to an attribute-value pair as Is_Correct_Sense=1, if the attribute corresponds to the sense of the value according to WSD. In other embodiments, the attribute-value pair may be assigned a score as Correct_Sense=x, where x is a score or rank assigned to the attribute of the attribute value pair according to a WSD algorithm.

In some embodiments, a score may be assigned to an attribute-value pair according to whether the attribute and/or value of the pair corresponds to a main topic or concept associated with the product record. Various methods exist to identify one or more topics to which a document relates. Accordingly, a score may be assigned to an attribute-value pair as one of more of Is_Topical=1, Attribute_Is_Topical=1, Value_Is_Topical=1, or the like according to whether the attribute and/or value correspond to a topic associated with a product record, e.g. the top N topics associated with a product record. In some embodiments, concepts and/or topics associated with a product record may be extracted according to the methods disclosed in U.S. patent application Ser. No. 13/300,524, entitled "PROCESSING DATA FEEDS," filed Nov. 18, 2011, which is hereby incorporated herein by reference in its entirety.

Some or all of the scores assigned as described hereinabove may then be evaluated 510 using a machine learning model trained as described hereinabove to evaluate the relevance of an attribute-value pair to scores as described above. As noted above, the machine learning model may be a decision tree model or some other machine learning algorithm. Other means for relating scores to training data may also be used such as logistic regression or other statistical method. In some embodiments, an outcome of the learning model is a binary value indicating that an attribute-value pair is or is not relevant (e.g. should be retained or discarded). In other embodiments, the model may output a score that may be used to rank attribute-value pairs. Those attribute-value pairs with scores above a threshold may then be retained for the product record. In other embodiments, the top N attribute-value pairs with the highest scores from the model may be retained for use according to methods described herein.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for classifying, the method comprising:
   identifying, by a computer system, a plurality of values in a document;
   identifying, by the computer system, a plurality of candidate attributes for the document based on the plurality of values;
   selecting, by the computer system, one or more selected attributes from the plurality of candidate attributes according to an application of an attribute selection rule to the plurality of values, the plurality of candidate attributes, and the document; and
   associating, by the computer system, the one or more selected attributes with the document,
   wherein:
      selecting the one or more selected attributes from the plurality of candidate attributes according to the application of the attribute selection rule to the plurality of values, the plurality of candidate attributes, and the document further comprises:
         applying a machine learning algorithm to the plurality of candidate attributes and the document; and
      the machine learning algorithm is a decision tree algorithm.

2. The method of claim 1, wherein associating the one or more selected attributes with the document comprises:
   associating the one or more selected attributes with a category to which the document belongs.

3. The method of claim 1, wherein selecting the one or more selected attributes from the plurality of candidate attributes according to the application of the attribute selection rule to the plurality of values, the plurality of candidate attributes, and the document further comprises:
   applying the attribute selection rule taking as an input a set of predicted product types for the document.

4. The method of claim 1, wherein selecting the one or more selected attributes from the plurality of candidate attributes according to the application of the attribute selection rule to the plurality of values, the plurality of candidate attributes, and the document further comprises:
   applying the attribute selection rule taking as an input a proximity of one or more of the plurality of values to a textual representation of a corresponding attribute of the plurality of candidate attributes.

5. The method of claim 1, wherein selecting the one or more selected attributes from the plurality of candidate attributes according to the application of the attribute selection rule to the plurality of values, the plurality of candidate attributes, and the document further comprises:
   applying a rule with respect to a location of a corresponding value of the plurality of values in the document.

6. The method of claim 1, wherein selecting the one or more selected attributes from the plurality of candidate attributes according to the application of the attribute selection rule to the plurality of values, the plurality of candidate attributes, and the document further comprises:
   applying a rule with respect to a usage of a value of the plurality of values corresponding to an attribute of the plurality of candidate attributes.

7. The method of claim 1, wherein:
   the document is a product record for a product.

8. The method of claim 7, wherein associating the one or more selected attributes with the document further comprises:
   augmenting the product record from an unstructured product record to a product record with structured attribute-value data.

9. A method for classifying, the method comprising:
   identifying, by a computer system, a plurality of values in a document;
   identifying, by the computer system, a plurality of candidate attributes for the document based on the plurality of values;

selecting, by the computer system, one or more selected attributes from the plurality of candidate attributes according to an application of an attribute selection rule to the plurality of values, the plurality of candidate attributes, and the document; and associating, by the computer system, the one or more selected attributes with the document, wherein selecting the one or more selected attributes from the plurality of candidate attributes according to the application of the attribute selection rule to the plurality of values, the plurality of candidate attributes, and the document further comprises:

applying a rule with respect to a part of speech of a value of the plurality of values corresponding to an attribute of the plurality of candidate attributes.

10. A method for classifying, the method comprising:

identifying, by a computer system, a plurality of values in a document;

identifying, by the computer system, a plurality of candidate attributes for the document based on the plurality of values;

selecting, by the computer system, one or more selected attributes from the plurality of candidate attributes according to an application of an attribute selection rule to the plurality of values, the plurality of candidate attributes, and the document; and associating, by the computer system, the one or more selected attributes with the document, wherein selecting the one or more selected attributes from the plurality of candidate attributes according to the application of the attribute selection rule to the plurality of values, the plurality of candidate attributes, and the document further comprises:

applying a rule with respect to whether a value of the plurality of values corresponding to an attribute of the plurality of candidate attributes is included within a superstring in a title of a node of a taxonomy.

11. A system for classifying, the system comprising one or more processors and one or more memory devices operably coupled to the one or more processors, the one or more memory devices storing executable and operational code effective to cause the one or more processors to:

identify a plurality of values in a document;

identify a plurality of candidate attributes for the document based on the plurality of values;

select one or more selected attributes from the plurality of candidate attributes according to an application of an attribute selection rule to the plurality of values, the plurality of candidate attributes, and the document; and associate the one or more selected attributes with the document, wherein:

the executable and operational code are further effective to cause the one or more processors to select the one or more selected attributes from the plurality of candidate attributes according to the application of the attribute selection rule to the plurality of values, the plurality of candidate attributes, and the document by:

applying a machine learning algorithm to the plurality of candidate attributes and the document; and the machine learning algorithm is a decision tree algorithm.

12. The system of claim 11, wherein the executable and operational code are further effective to cause the one or more processors to associate the one or more selected attributes with the document by:

associating the one or more selected attributes with a category to which the document belongs.

13. The system of claim 11, wherein the executable and operational code are further effective to cause the one or more processors to select the one or more selected attributes from the plurality of candidate attributes according to the application of the attribute selection rule to the plurality of values, the plurality of candidate attributes, and the document by:

applying the attribute selection rule taking as an input a set of predicted product types for the document.

14. The system of claim 11, wherein the executable and operational code are further effective to cause the one or more processors to select the one or more selected attributes from the plurality of candidate attributes according to the application of the attribute selection rule to the plurality of values, the plurality of candidate attributes, and the document by:

applying the attribute selection rule taking as an input a proximity of one or more of the plurality of values to a textual representation of a corresponding attribute of the plurality of candidate attributes.

15. The system of claim 11, wherein the executable and operational code are further effective to cause the one or more processors to select the one or more selected attributes from the plurality of candidate attributes according to the application of the attribute selection rule to the plurality of values, the plurality of candidate attributes, and the document by:

applying a rule with respect to a location of a corresponding value of the plurality of values in the document.

16. The system of claim 11, wherein the executable and operational code are further effective to cause the one or more processors to select the one or more selected attributes from the plurality of candidate attributes according to the application of the attribute selection rule to the plurality of values, the plurality of candidate attributes, and the document by:

applying a rule with respect to a usage of a value of the plurality of values corresponding to an attribute of the plurality of candidate attributes.

17. The system of claim 11, wherein:

the document is a product record for a product.

18. The system of claim 17, wherein the executable and operational code are further effective to cause the one or more processors to associate the one or more selected attributes with the document by:

augmenting the product record from an unstructured product record to a product record with structured attribute-value data, the structured attribute-value data comprising the one or more selected attributes.

19. A system for classifying, the system comprising one or more processors and one or more memory devices operably coupled to the one or more processors, the one or more memory devices storing executable and operational code effective to cause the one or more processors to:

identify a plurality of values in a document;

identify a plurality of candidate attributes for the document based on the plurality of values;

select one or more selected attributes from the plurality of candidate attributes according to an application of an attribute selection rule to the plurality of values, the plurality of candidate attributes, and the document; and associate the one or more selected attributes with the document, wherein the executable and operational code are further effective to cause the one or more processors to select the one or more selected attributes from the plurality of candidate attributes according to the application of the attribute selection rule to the plurality of values, the plurality of candidate attributes, and the document by:

applying a rule with respect to a part of speech of a value of the plurality of values corresponding to an attribute of the plurality of candidate attributes.

20. A system for classifying, the system comprising one or more processors and one or more memory devices operably coupled to the one or more processors, the one or more memory devices storing executable and operational code effective to cause the one or more processors to:
  identify a plurality of values in a document;
  identify a plurality of candidate attributes for the document based on the plurality of values;
  select one or more selected attributes from the plurality of candidate attributes according to an application of an attribute selection rule to the plurality of values, the plurality of candidate attributes, and the document; and
  associate the one or more selected attributes with the document,
  wherein the executable and operational code are further effective to cause the one or more processors to select the one or more selected attributes from the plurality of candidate attributes according to the application of the attribute selection rule to the plurality of values, the plurality of candidate attributes, and the document by:
    applying a rule with respect to whether a value of the plurality of values corresponding to an attribute of the plurality of candidate attributes is included within a superstring in a title of a node of a taxonomy.

* * * * *